Figure 1:
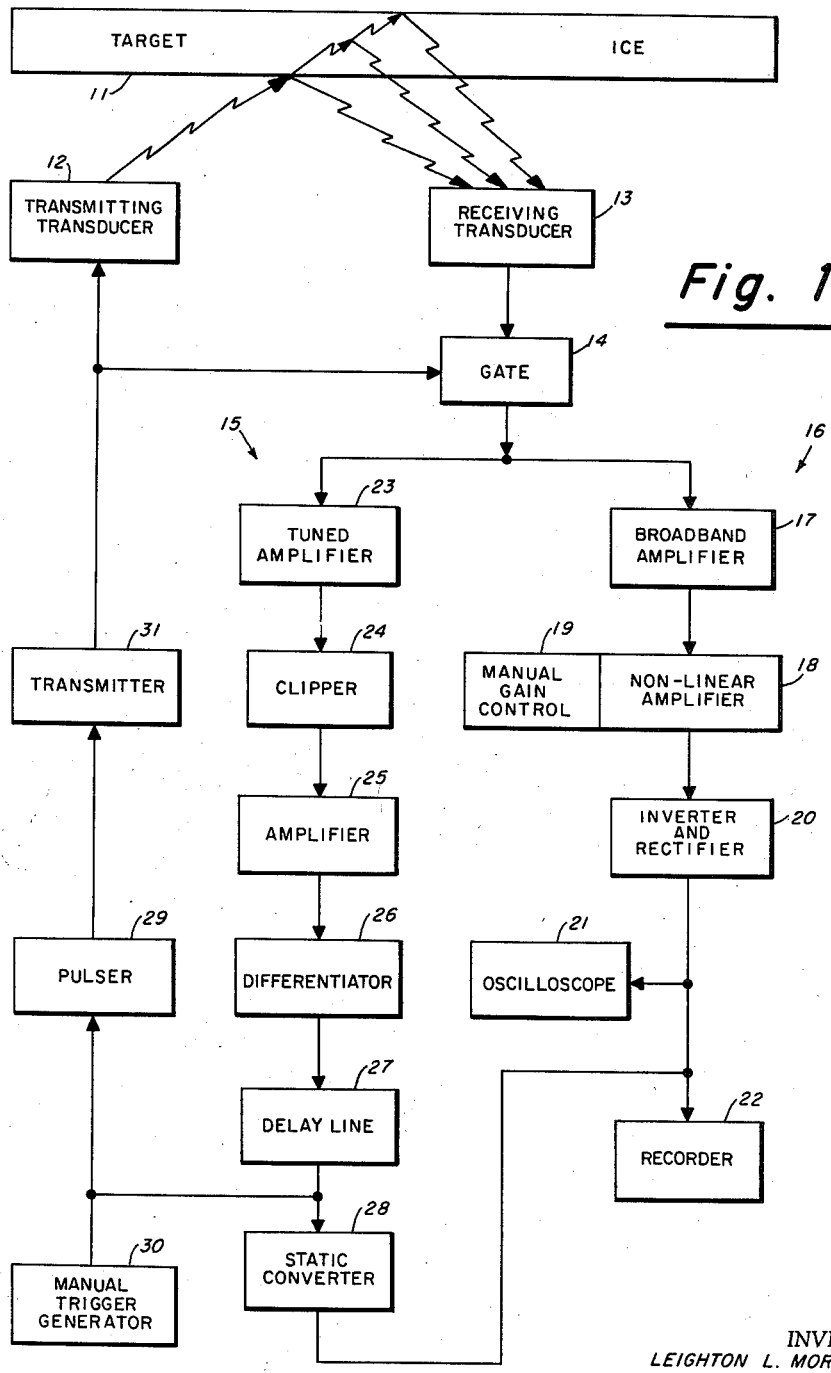

INVENTOR.
LEIGHTON L. MORSE

Feb. 25, 1964    L. L. MORSE    3,122,720
TARGET RANGE AND MATERIAL ANALYZER SYSTEM
Filed June 2, 1961    3 Sheets-Sheet 2

INVENTOR.
LEIGHTON L. MORSE
BY
ATTORNEYS

Feb. 25, 1964     L. L. MORSE     3,122,720
TARGET RANGE AND MATERIAL ANALYZER SYSTEM
Filed June 2, 1961     3 Sheets-Sheet 3

INVENTOR.
LEIGHTON L. MORSE
BY
ATTORNEYS

United States Patent Office 3,122,720
Patented Feb. 25, 1964

3,122,720
TARGET RANGE AND MATERIAL ANALYZER SYSTEM
Leighton L. Morse, San Diego, Calif., assignor to the United States of America as represented by the Secretary of the Navy
Filed June 2, 1961, Ser. No. 114,571
14 Claims. (Cl. 340—3)
(Granted under Title 35, U.S. Code (1952), sec. 266)

The invention described herein may be manufactured and used by or for the Government of the United States of America for governmental purposes without the payment of any royalties thereon or therefor.

The present invention relates in general to echo-ranging apparatus and in particular is a sonar system for measuring, indicating, and recording the range, thickness, substance, and consistency of ice and other target materials.

In many instances, such as, for example, during navigation of submarines in artic waters, it is desirable to know if ice exists at the surface of the water, and, if so, what its quality and general physical characteristics are. This information facilitates making decisions with respect to whether it is feasible to surface safely by breaking through the ice, whether it is possible to safely continue along the planned navigation route without running into submerged or surface ice or the ground in an attempt to avoid the same, and whether or not a hole is present in an ice sheet above the navigating vessel.

In the past, echo-ranging acoustical or electromagnetic signals have been employed to determine target ranges. However, with respect to targets composed of various and sundry materials such as ice, for example, the prior art has been considerably limited because, essentially, only the relative distances to the nearest surfaces thereof have been obtained. This leaves a great deal to be desired in operations such as arctic navigation operations where, as previously stated, it is certainly advantageous to know the physical characteristics of the ambient environment. It would, in many instances, likewise be advantageous to be able to easily ascertain at least in some degree the substance, composition, consistency, and the like, of other target materials as well as its range and thickness.

Although the pertinent devices of the prior art may be useful for various specific and limited purposes, the target range and material analyzer system constituting this invention increases the scope of echo-ranging devices in such manner as to provide a considerable amount of valuable information heretofore unattainable thereby. Hence, due to the new and useful effects produced by the subject invention, many of the objections of the prior art have been overcome and an improved range and material analyzer system which is superior thereto results accordingly.

It is, therefore, an object of this invention to provide an improved target range and material analyzer system.

Another object of this invention is to provide an improved method and means for determining the distance to and thickness and composition of an ice target.

A further object of this invention is to provide an improved sonar system for accurately determining and indicating the physical characteristics of the subaqueous ambient environmental medium of a submarine navigating along a predetermined path.

A still further objective of this invention is to provide improved method and means for facilitating the navigation of vessels and vehicles in the arctic and antarctic regions.

Another object of this invention is to provide an improved method and means for carrying on a scientific investigation of the characteristics of various and sundry materials, either on a continuous or instantaneous basis.

Still another object of this invention is to provide an echo-ranging system that has its transmitted signal effectively triggered by the received signal.

A further objective of this invention is to provide an improved echo-ranging system which effectively reads out the distance to a target and the physical characteristics thereof on a recording instrument.

Another object of this invention is to provide an improved method and means for measuring the distance between the surface of water and ice, if any, adjacent thereto or floating thereon.

Another object of this invention is to provide an efficient echo-ranging system which has a minimum of distortion effects and an improved signal to noise ratio.

Still another object of this invention is to provide a method and means which facilitates the interpretation and evaluation of graphically displayed data by a human operator.

Another object of this invention is to provide an improved material analyzer which functions equally well regardless of whether the material being analyzed is moving with respect thereto or the subject analyzer is moving with respect to the material being analyzed, and thereby enabling continuous material analysis to occur in either event.

Still another object of this invention is to provide a relatively simple, practical, and dependable range and material analyzer which is easily and economically manufactured and maintained.

Figure 2:
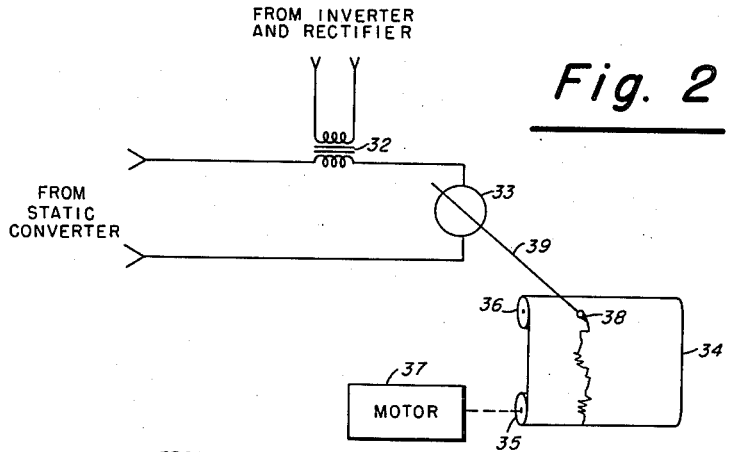
Figure 3:
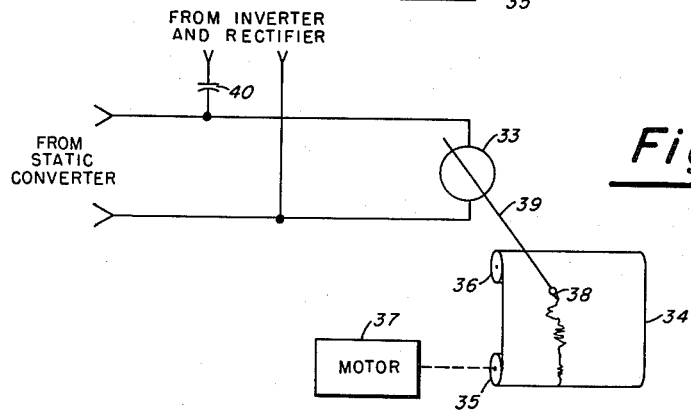
Figure 5:
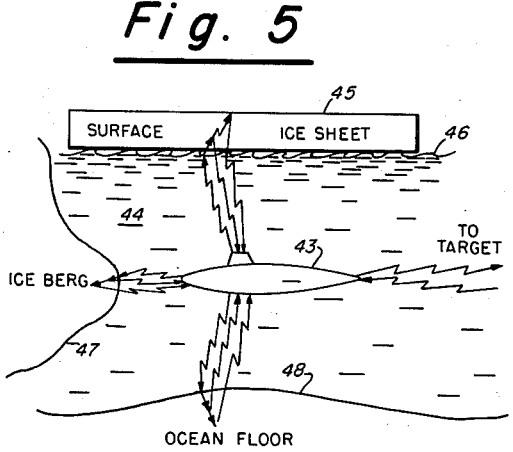
Figure 4:
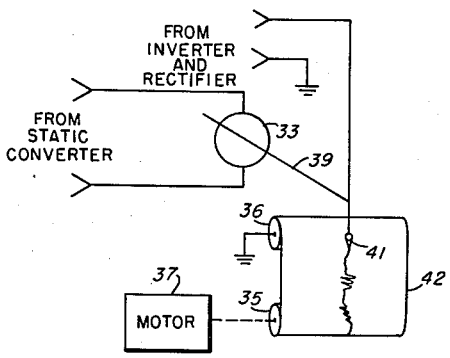
Figure 6:
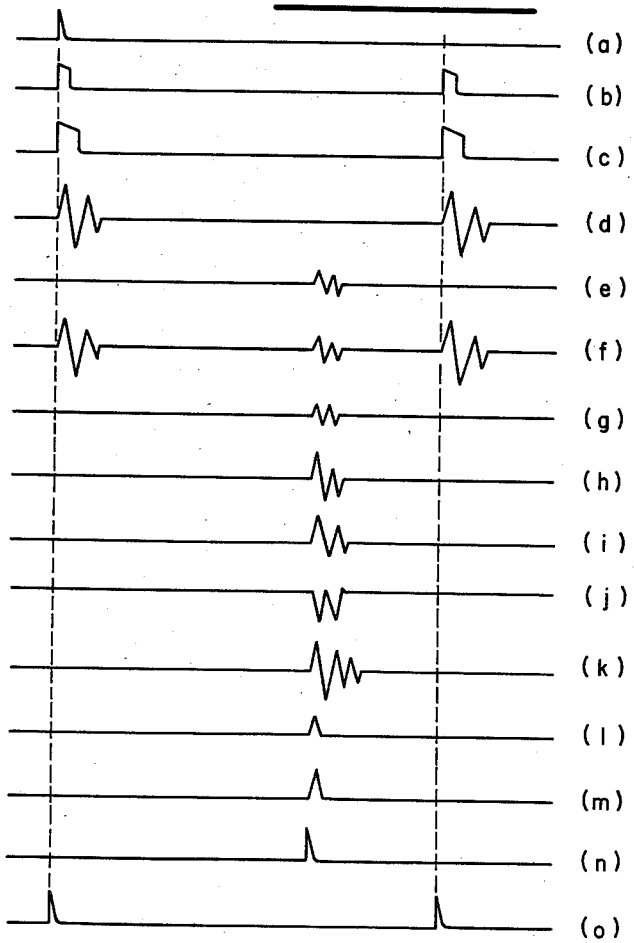
Figure 7:
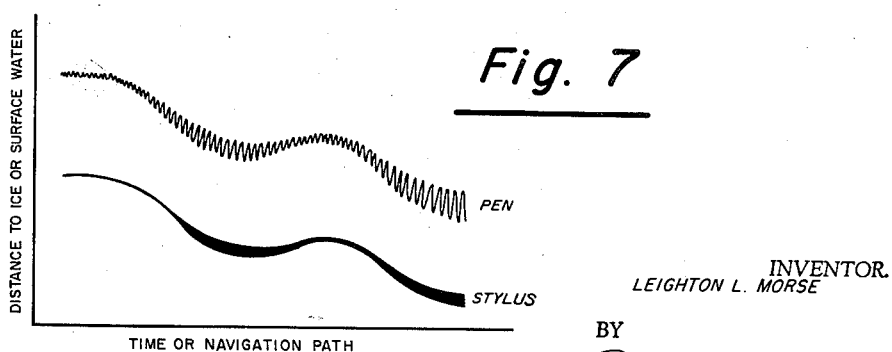

Other objects and many of the attendant advantages of this invention will be readily appreciated as the same becomes better understood by reference to the following detailed description when considered in conjunction with the accompanying drawing wherein:

FIG. 1 is a block diagram of an exemplary embodiment of the range and material analyzer system constituting the present invention;

FIGS. 2, 3, and 4 represent three exemplary types of recorders and input circuits thereto that may be incorporated in the present invention;

FIG. 5 pictorially illustrates a submarine boat navigating in icy water by means of the subject invention while it is being used as a range finding and ice analyzing sonar system;

FIG. 6 is a graphical illustration of typical, simplified output signal waveforms of the several components of the subject invention; and FIG. 7 shows an exemplary readout of several types of data indicia that may be produced on a strip chart, depending on the type of recorder employed.

Referring now to the drawing, FIG. 1 depicts an exemplary embodiment of the invention as echo-ranging on a target 11 which may be of any suitable material such as, for instance, ice that may form on or near the surface of sea water or fresh water occurring in oceans and lakes, respectively, or the like. However, it should be understood that any other appropriate material may be used as a target for range or analysis purposes. Moreover, it should also be understood that there may or may not be relative movement between the target and the subject invention during echo-ranging and analysis operations. But, in event continuous ranging or analysis of the target material is desired, it may be moved with respect to the subject anlayzer or vice versa. Thus, for example, the target material may be successively unrolled off of and rolled on to suitable power driven spools with the analysis operation being effected therebetween. Or, in the alternative, the subject analyzer may be disposed on a movable vehicle which is appropriately passed along the material to be analyzed, and so doing should be considered as being within the scope and spirit of the present invention.

A pair of transducers defined herein as a transmitting transducer 12 and a receiving transducer 13 actually project and receive the echo-ranging energy, respectively. Although it has been found to be expedient in the sample embodiment disclosed herein to use two transducers to perform the energy broadcasting and receiving functions, a single reversible transducer may be substituted therefor in conjunction with a suitable transmit-receive switching arrangement instead, if so desired, and that so doing would merely involve the design choice of the artisan. The subject transducers are, likewise, intended to be of the type which are appropriate for the environmental medium within which they are operating. Hence, it should be understood that said transducer may be of the electromechanical, electroacoustical, electromagnetic types, or the like, that will effect optimum operations in accordance with the predetermined operational conditions.

Considering now the receiver portion of the invention shown in FIG. 1, the output of receiving transducer 13 is coupled to a control gate 14, the output of which is simultaneously coupled to a tuned, narrowband signal processing channel 15 and a broadband signal processing channel 16.

Broadband channel 16 incorporates a broadband amplifier 17 which has, for instance, a frequency bandwidth of the order of plus and minus fifty percent of the broadcast frequency, with the center thereof located at substantially said broadcast frequency. Broadband amplifier 17 has its input coupled to the output of gate 14 and its output coupled to the input of a non-linear amplifier 18 which, in turn, has a manual gain control 19 integrally connected therewith. The output of non-linear amplifier 18 is coupled to an inverter and rectifier 20, the output of which is fed to an appropriate readout means such as an oscilloscope 21 and strip chart recorder 22 or the like.

The output of gate 14 is also applied to the input of a tuned amplifier 23 of the narrow band channel 15. The output of tuned amplifier 23 is then fed to a clipper 24, then through another amplifier 25, and to a differentiator 26. The output of differentiator 26 is coupled to an appropriate delay line 27 which may be of the acoustical or electromagnetic type, or the like, depending on the use, the environment, and any other conditions under which the subject invention is intended to be operated, and which has a time delay period that is at least long enough to include the entire transmission period, which typically may be of the order of one to five milliseconds. The output of delay line 27 is applied to a static converter 28 of the type disclosed, for instance, in Geophysics magazine, vol. XXVI, No. 2, dated April 1961, at page 61. Converter 28, in turn, has its output connected to the aforesaid recorder 22 for physical positioning of the pen or stylus, as the case may be.

In event further processing of the output signals from the aforesaid broad and narrow band channels is desired in order to produce other readout parameters, they may be applied as inputs to any pertinent data processing, computing or control equipment or other apparatus that will effect the results wanted without departing from the herein disclosed inventive concept.

Recorder 22 may be of several conventional types which allows a first input signal to properly position a stylus or pen in proportion to the voltage or current level thereof, and, in addition, enables a second input signal applied thereto to increase or decrease the contrast or density of the indication made by the stylus type recorder if such is used, or, in the alternative, modulate said first input signal by superimposing the second input signal thereon in accordance with the amplitude level and frequency of the voltage or current thereof, in event a pen type recorder is used.

If the stylus type of recorder is preferred, the variable density or contrast in the graphical readout line indication may be effected, for example, by using electrosensitive paper as the recording strip chart. One type of such paper is the Teledeltos electrosensitive paper manufactured by the Western Union Corporation, although others are commercially available as well.

In event the pen type recorder is preferred, the modulation of the tuned channel output signal with the broadband channel output signal provides characterized amplitude and frequency variations which when properly calibrated may be easily interpreted and evaluated as various and sundry target material conditions, such as thickness, substance, consistency, etc. Hence, at this time, it can readily be seen that the aforesaid pair of channel output signals are effectively combined either physically or electrically to provide readout information containing a predetermined variety of intelligence, of which a more detailed explanation thereof will be presented in connection with the explanation of other pertinent drawing figures and of the overall operation of the subject invention below.

Delay line 27 likewise has its output signal coupled to the input of a pulser 29. Said pulser 29 may, for instance, be any pertinent conventional type such as a gated pulse amplifier or shaper or even a parallel capacitor and gas discharge tube arrangement. A manual trigger generator 30 is also coupled to the input of pulser 29 for initially actuating same at the beginning of operations or any other time as desired by the human operator. Pulser 29 has its output signal applied to a transmitter 31 which, in turn, has its output coupled to the aforementioned transmitting transducer 12 and control gate 14.

Although ostensibly obvious to one skilled in the art, each of the foregoing components are conventional per se, and it is their unique arrangement, combination, and interaction which constitutes the subject invention and effects the new and useful results produced thereby, and this, accordingly, should be understood.

Referring now to FIG. 2 there is shown one example of recorder 22 in diagrammatical form with one set of input terminals thereof connected through the secondary winding of a transformer 32 to a pen positioning drive motor mechanism 33 such as a galvanometer, an electronic null-balance system, or the like that is conventional in the recorder art and that is convenient in subject invention. Said one set of input terminals are adapted for being coupled to the output of static converter 28. The primary winding of transformer 32 is connected to another set of input terminals which, in turn, are adapted for being connected to the output inverter and rectifier 20.

A strip chart 34 is rolled on wind and unwind spools 35 and 36, respectively, with said wind spool being mechanically driven by a manually controllable, variable speed drive motor 37. A pen 38 mounted on the end of an arm 39 causes ink to be disposed on said strip chart at a position relative to a predetermined datum (such as perhaps the edge of said chart) that is proportional to the combined signals received at the aforesaid input terminals.

FIG. 3 illustrates another example of recorder 22 which is substantially identical to that shown in FIG. 2 except that the input signals are combined by means of capacitor coupling through a condenser 40.

FIG. 4 depicts still another recorder 22 of the electrosensitive paper type. Like in the preceding recorders, the output of the static converter 28 drives the galvanometer or null-balance motor which, in turn, positions a stylus 41. However, instead of an ordinary strip chart, this example recorder includes a grounded electrosensitive paper strip chart 42, although it may be driven as is otherwise conventional. But, in this case the output signals of inverter 20 are applied to ground and to stylus 41 to complete the electrical circuit therebetween where said stylus contacts said paper, thereby causing a line to be drawn thereat which has a density, contrast, or darkness that is proportional to the amplitude and frequency of said inverter output signals.

FIG. 5 illustrates a typical use of a sonar type embodiment of the subject invention. A submarine boat 43 is depicted as navigating in icy waters 44, such as might be found in arctic or antarctic geographical regions. Acoustical energy in the subsonic, sonic, supersonic, or ultrasonic frequency ranges are being broadcast by the subject invention from said submarine boat to various and sundry targets such as an ice sheet 45, a surface of the water 46, an iceberg 47, an ocean floor rock or sediment 48, or any other target material.

Obviously, any number of transmitting and receiving transducers may be employed at any preferred location or locations of the submarine and, of course, when the direction of energy propagation is known, the direction to or bearing of any given target will be known too. When processed in the target range and material analyzer system constituting this invention that is disposed within said submarine, the ambient environment thereof becomes better known for most practical purposes.

Briefly, the operation of the present invention is explained as follows in conjunction with FIGS. 5 through 7 of the drawing.

For the purpose of keeping this explanation relatively simple, it will be assumed that the subject range and material analyzer is being used as a unique sonar system to ascertain the distance from a submarine boat submerged within an aqueous medium, such as sea water or the like, to the underside of an ice sheet contiguously disposed with the surface thereof and also to determine the thickness and other physical characteristics of said ice sheet as well and at the same time as substantially depicted in FIG. 5, although as previously mentioned, other uses are intended too and their value should not be depreciated merely because only one type of operation is elaborated in more detail herein.

Once the subject analyzer is turned on and in proper running condition, it becomes necessary to initiate the first transmission, after which transmission and reception will continue to occur in a substantially cyclical manner until the analyzer is turned off. Initiation of transmission is achieved by manually operating the trigger generator 30 which triggers pulser 29 by a signal whose waveform is represented essentially by FIG. 6(a). Pulser 29, in turn, initially actuates transmitter 31 by an appropriate predetermined signal having a waveform similar to that shown in FIG. 6(b). Transmitter 31, being of any predetermined conventional type, produces an electrical CW signal similar to that depicted in FIG. 6(c) which energizes transducer 12 to effect broadcast of an acoustical signal of the type represented by FIG. 6(d). This signal is, of course, the signal that is propagated through the ambient environmental medium (in this case, sea water) to impinge upon, penetrate into, and reflect from the target material (in this case, surface ice). Due to the fact that some of the propagated acoustical energy is absorbed by the target ice, and since that portion thereof which is reflected after penetration of said target ice becomes transformed somewhat with respect to that portion which is directly reflected from the underside thereof as a result of varying composition, substance, and perhaps density of the internal ice structure, the echo signal constitutes a composite of many signals, some of which contain various information intelligence about the physical properties of said ice, as well as the range and bearing thereof. Because it is possible to distinguish between the signals of the composite echo signal by means of the signal processing apparatus comprising the aforementioned broadband and tuned amplifier channels in this invention, it is also possible to readout such signals in the form of geophysical data or the like that can be easily interpreted by a human operator. FIG. 6(e) represents a typical acoustical echo signal that may be reflected from surface sheet ice to receiving transducer 13. Said receiving transducer, of course, converts the received acoustical echo signal into a proportional electrical signal such as is shown, for example, in FIG. 6(f) which facilitates its further processing in the aforesaid channels.

Control gate 14 is disposed between the output of receiving transducer 13 and each of channels 15 and 16. Gate 14 is of the type that is controlled to a pass or no-pass condition by an externally applied signal. In this case, gate 14 is such that it is closed by a signal being put out by transmitter 31 during broadcast so that cross-coupling between the transmitting and receiving transducer does not send an adverse spurious signal to signal processing channels 15 and 16 prior to the time the broadcast signal is reflected from the target. Conversely, when transmitter 31 is not broadcasting, gate 14 is open and the subject system is in a receive condition due to the fact that the output signals from receiving transducer 13 may pass to the inputs of broadband amplifier 17 and tuned amplifier 23 at that time.

Considering now the broadband channel operation, the electrical equivalent of the received acoustical signal is amplified by amplifier 17 and reamplified by non-linear amplifier 18 which is biased in one direction. In order that the broadband signals contain the proper amplitude with respect to the intelligence portion thereof as opposed to spurious noise signals, the non-linear amplifier is used to emphasize the former while relegating the latter to a substantially ineffective level, as indicated simply by the waveform of FIG. 6(i). Regulation of the relative levels thereof to an optimum ratio is effected by manual gain control 19 associated with non-linear amplifier 18 as a connected adjunct thereto or an inherent part thereof.

The output of non-linear amplifier 18 is fed through inverter and rectifier 20 to provide suitable polarity thereto and delete the high frequency components thereof (FIG. 6(j)) before it is applied to oscilloscope 21 for indicating purposes and to recorder 22 for recording purposes.

The output of gate 14 is likewise fed to tuned amplifier 23 which selects and passes certain signals within a predetermined frequency range while discriminating against and deleting the remaining signals. The passed output signals from tuned amplifier 23 are represented in an exemplary fashion by FIG. 6(k), and these signals are fed to clipper 24 where the portion thereof below a predetermined amplitude is removed, leaving only the peak portions of the pertinent high amplitude signals, as is depicted in FIG. 6(l). These peak signals are then fed to amplifier 25 where they are amplified to a more useful value (see FIG. 6(m)), from which they are applied to differentiator 26 to form signals having sharp, rapid-rise wavefronts, as is illustrated in FIG. 6(n). Said sharp, rapid-rise signals are then delayed a predetermined time period by delay line 27 which eliminates any existing distortion as a result of adverse cross-coupling.

Since this is an explanation of a sonar type range and material analyzer system instead of a radar or other type, the aforementioned delay line 27 should be any appropriate one of the acoutical delay line variety; however, it should be understood that for radar as other type operation, a suitable delay line of the electromagnetic variety or otherwise should be selected and substituted therefor. Obviously, in view of the teaching herein present, so doing would merely be a matter of design choice and would be well within the purview of the skilled artisan.

In any event, it should be noted that the operative time constant of said delay line is considerably shorter than that of the aforementioned recorder 22, which accordingly causes phase differences between the outputs of the broad and narrow band channels, if any, to be of negligible consequence, as far as readout is concerned, regardless of whether or not the delay line selected is of the acoustical or electromagnetic type or the like.

The delayed differentiated output signals are fed from delay line 27 through two respective electrical paths to the inputs of static converter 28 and pulser 29. Static converter 28 is a rather well known device that provides a continuous current or voltage output signal that is either directly or inversely proportional to the average number of input pips, pings, pulses, or trigger-like signals applied thereto during a given period of time. In this case, if the number of delayed differentiated signals being applied thereto are increasing per unit of the time, the output current or voltage decreases proportionally thereto, and in event the number of delayed differential signals being applied thereto are decreasing per unit of time, the output current or voltage increases proportionally thereto, although the opposite function may be employed, too, if so desired, to provide input signals more suitable to associated equipment or to provide any preferred type of readout indications. The output signal of delay line 27 is typically represented by FIG. 6(o). It is, of course, substantially similar in waveform to the output signal of manual trigger generator 30 and is likewise used to timely trigger pulse 29.

Recorder 22 may be any of a variety of conventional types, as previously mentioned. But each may operate on a different principle or in a somewhat different manner. For instance, as shown in FIGS. 2, 3, and 4, various input circuits may be employed, and these input circuits could connect to a galvanometer type motor mechanism or an electronic null-balance type motor mechanism or the like as desired, in order to properly position the recording pen or stylus. In event, a pen is used rather than a stylus, the outputs from inverter 20 and static converter 28 are applied to the recorder by means of the input circuits shown in FIGS. 2 and 3, resulting in their being combined as the input to the aforesaid recorder motor mechanism. Thus, it can readily be seen that modulation of the static converter output signal with the inverter output signal provides character thereto. This, of course, is due to the fact that the static converter output signal represents target range while the output signal from inverter and rectifier 20 represents the thickness and physical characteristics of the target ice because the various and sundry frequencies and the respective phases thereof have not been deleted as a result of the processing of the echo signal in the broadband channel.

In event the electrosensitive paper type of recorder is employed, the hookup is as shown in the example of FIG. 4 is used. In this case, the output signal from static converter 28 is applied alone to the recording motor mechanism while the output signal from the inverter and rectifier is applied to the stylus itself. The variable density of the graphic readout line occurs as a result of the varying current passing through the stylus and the electrosensitive paper at the point of their mutual contact, and, of course, said current varies in proportion to the physical characteristics of the ice or other target material.

When considered from the standpoint of what is read out or recorded on the recorder strip chart, it can be seen from the two examples presented in FIG. 7 that the indicia thereof may be positioned with respect to a reference datum or varied sufficiently with respect to trace amplitude or line density to provide both range and target characteristics information respectively. Whether this is done by means of a pen recording a basic range line with various changing frequencies superimposed thereon or by means of a stylus making a variable density range line to graphically provide the readout information desired is merely a matter of choice. The important factor is that either may be compared with known operational target conditions for calibration purposes and, thence, used to evaluate similar unknown factors during actual operational conditions.

After the initial pulse or ping is broadcast, the subject device continues its operation in a self-sustaining recycling manner, due to the fact that, effectively, the received signal ultimately actuates the transmitting apparatus to cause broadcast of subsequent pulses or pings to occur. Under such circumstances, as previously implied, the pulse rate is a function of range and, thus, in this case, the distance to any given target material is inversely proportional to the number of pings transmitted and received during any given period of time. Thus, if these pings are added and subtracted as necessary to keep the aforesaid proportional relationship intact and produce an intelligence output signal having a level or value in accordance therewith, an indication of the range of said target material is obtained and may be recorded or otherwise read out. This is exactly what occurs in the subject invention. In addition, however, said range indicating intelligence output signal is modulated by another output signal corresponding to that portion of the echo signal appropriately processed in the broadband channel and this, in turn, applies character thereto in accordance with physical and dimensional characteristics of the target material.

The "character" which occurs in the graphical readout and which corresponds to the aforementioned physical characteristics of the target material actually results due to the penetration thereof by the echo-ranging energy signal pulse before it is reflected back to the receiver. This penetration modifies or changes a portion of the broadcast signal pulse which is reflected after penetration in proportion to said physical characteristics, thereby causing it to be distinguishable from that portion of the echo signal reflected from the nearest surface. Thus, when these two outputs are respectively processed and properly combined as mentioned above, considerable performance improvement occurs and a great deal more information and data concerning any given target is obtained.

Depending on the ranges and materials being analyzed, the type and frequency of propagated energy most operationally suitable is selected to most nearly provide the information or characteristic parameters desired from the analysis. In some instances, compromises with respect to frequency selection must be made in order to achieve useful range distances or target penetration, as well as other factors affecting overall optimum results. For example, acoustical energy of one thousand cycles per second may provide optimum operation when the present device is used as a sonar system to determine the range and physical characteristics of sea ice, but some other type of energy such as, perhaps, electromagnetic energy of considerably higher frequency may be required in event the device is being used in an environment other than a subaqueous done. Since such teaching is incorporated herein, it would be well within the purview of the artisan to make the necessary design selections to cover any particular operational environmental circumstances, and so doing should, therefore, be understood as being within the scope and spirit of this invention.

Obviously, many other modifications and variations of the present invention are possible in the light of the above teachings. It is therefore to be understood, that within the scope of the appended claims, the invention may be practiced otherwise than as specifically described.

What is claimed is:

1. A target range and material analyzer system comprising a transmitting transducer adapted for broadcasting a signal to a target, a receiving transducer adapted for receiving that portion of said broadcast signal reflected from said target, a first channel effectively connected to said receiving transducer for passing that portion of said received reflected signal occurring within a predetermined narrow frequency band, a second channel effectively connected to said receiving transducer for passing that portion of said received reflected signal occurring within a predetermined wide frequency band including said narrow frequency band and relative thereto, means coupled to the outputs of said first and second channels for effectively mixing the signals passed therethrough and recording same in terms of a single composite output parameter, and means interconnecting said first channel and said transmitting transducer for energizing said transducer after a predetermined time period after said reflected signal is received by said receiving transducer.

2. Means for analyzing the range and physical characteristics of a target comprising in combination, a transmitting transducer, a receiving transducer, a first signal processing channel adapted for passing a portion of a received signal occurring within a predetermined narrow frequency band, a second signal processing channel adapted for passing a portion of said received signal occurring within a predetermined frequency band which is wide with respect to said narrow frequency band, means coupled to the output of said first signal processing channel for converting the total number of signals processed thereby in a given period of time to a continuous single output signal that is inversely proportional thereto, means coupled to said converting means and said second signal processing channel for modulating the continuous single output signal of the former with the passed output signals of the latter and recording same as a composite output parameter, transmitter means connected to said transmitting transducer for driving same, means interconnecting said first signal processing channel and said transmitter for timely energizing same, and means connected to the output of said transmitter for effectively connecting said first and second signal processing channels to the output of said receiving transducer when said transmitter is de-energized.

3. A sonar system for determining the distance to and thickness of surface ice from a submarine boat submerged within sea water comprising in combination, a transmitter, a first transducer coupled to said transmitter for response to the output thereof, said first transducer being adapted for broadcasting acoustical energy of predetermined frequency in response to said transmitter output, a second transducer adapted for receiving the acoustical energy broadcast by said first transducer after it has been reflected by said surface ice and converting same into an electrical output signal proportional thereto, a tuned narrow band signal processing channel adapted for passing and shaping signals having the same frequency as the aforesaid predetermined acoustical energy frequency, an acoustical delay line coupled to said tuned narrowband signal processing channel for delaying said passed and shaped signals a given time period, means interconnecting said acoustical delay line and the aforesaid transmitter for pulsing same in accordance with the time sequence of said delayed signals, a static converter connected to the output of said delay line, a broadband signal processing channel adapted for passing signals within a predetermined frequency range including the frequency of the aforesaid broadcast acoustical energy, means connected to said static converter and said broadband signal processing channel for effectively superimposing the output signals of one on the output of the other and recording same in terms of distance to and thickness of surface ice from said submarine boat, and means connected to the output of said second transducer and the inputs of the aforesaid narrowband and broadband signal processing channels for rendering same ineffective when said first transducer is broadcasting said acoustical energy through said sea water.

4. The device according to claim 3 wherein said tuned narrowband signal processing channel comprises a tuned amplifier, a clipper coupled to the output of said tuned amplifier, and a differentiator effectively connected to the output of said clipper.

5. The device according to claim 3 wherein said broadband signal processing channel comprises a broadband amplifier, a non-linear amplifier coupled to the output of broadband amplifier, and an inverter connected to the output of said non-linear amplifier.

6. The device of claim 3 further characterized by a manual trigger generator connected to the input of said means interconnecting said acoustical delay line and the aforesaid transmitter for pulsing same in accordance with the time-sequence of said delayed signals.

7. The device of claim 3 further characterized by an oscilloscope connected to the outputs of said static converter and the aforesaid broadband signal processing channel.

8. An echo-ranging system comprising in combination, a transmitter means for broadcasting energy, a receiver means for receiving and processing the energy broadcast by said transmitting means, said receiver means including means for distinguishing between a predetermined narrowband of signals and a band of signals that is broader than said narrowband of signals and includes the same at substantially the center thereof, means interconnecting said transmitter and receiver means for alternately deactivating one when the other is activated, means connected to the outputs of said receiver means for reading out the signals processed thereby in terms of the distance to and thickness of a predetermined target material, and a manual trigger generator connected to the input of said transmitter means for initial actuation thereof.

9. A range and material analyzer comprising in combination, means for transmitting echo-ranging signals, means for receiving and converting said transmitted echo-ranging signals into a continuous direct current output signal which varies in proportion with the average number thereof reflected from a target material in a predetermined time period, means connected to said receiving and converting means for shaping the echo-ranging signals reflected from said target material, means connected to said receiving and converting means and said shaping means for effectively mixing and recording the respective outputs therefrom in terms of graphically displayed range, density, and thickness of said target material, means interconnecting said receiving and converting means for causing said transmitting means to broadcast each of said echo-ranging signals a predetermined time after the immediately preceding echo-ranging signal is reflected from said target material, and means coupled to the input of said transmitting means for causing same to initially broadcast an echo-ranging signal.

10. The device according to claim 9 wherein said means for receiving and converting said transmitted echo-ranging signals into a continuous direct current output signal which varies in proportion with the average number thereof reflected from a target material in a predetermined time period includes a tuned amplifier, a clipper coupled to the output of said tuned amplifier, a differentiator coupled to the output of said clipper, and a static converter effectively connected to the output of the aforesaid differentiator.

11. The device according to claim 9 wherein said means connected to said receiving and converting means for shaping the echo-ranging signals reflected from said target material include a broadband amplifier, a non-linear amplifier adapted for manual gain control connected to the output of said broadband amplifier, and an inverter and rectifier means coupled to the output of said non-linear amplifier.

12. The device of claim 9 wherein said means connected to said receiving and converting means and said shaping means for effectively mixing and recording the respective outputs therefrom in terms of graphically displayed range, density, and thickness of said target material comprises a readout recorder having a pen indicating and recording same on a movable motor-driven strip chart.

13. The device of claim 9 wherein said means connected to said receiving and converting means and said shaping means for effectively mixing and recording the respective outputs therefrom in terms of graphically displayed range, density, and thickness of said target material comprises a readout recorder having a stylus indicating and recording same as a variable density line on a movable motor-driven strip chart of electrosensitive paper.

14. A method of determining the distance to and thickness of an ice sheet floating on sea water from a submarine boat submerged therein comprising the steps of broadcasting acoustical energy of predetermined frequency toward said ice sheet, receiving the acoustical energy reflected from said ice sheet, separating those portions of said received acoustical energy which is substantially identical in frequency to the frequency of said broadcast acoustical energy, delaying those portions of said received acoustical energy which are separated, converting said delayed portions into a continuous direct current output signal that is inversely proportional to the average number thereof occurring in a predetermined time period, effectively mixing and recording said direct current output and the received energy reflected from said ice sheet in terms of distance to and thickness of the same, and using said delayed portions of said received acoustical energy to timely effect another subsequent broadcast thereof.

References Cited in the file of this patent

UNITED STATES PATENTS

| | | |
|---|---|---|
| 2,424,263 | Woodyard | July 22, 1947 |
| 2,495,690 | Bradley | Jan. 31, 1950 |
| 2,896,205 | Berger | July 21, 1959 |
| 2,923,003 | Hobrough et al. | Jan. 26, 1960 |